(12) United States Patent
Sheridon et al.

(10) Patent No.: US 6,362,915 B1
(45) Date of Patent: *Mar. 26, 2002

(54) BICHROMAL BEADS HAVING CRYSTALLINE MATERIALS THEREIN

(75) Inventors: Nicholas K. Sheridon, Los Altos; Edward A. Richley, Palo Alto; James Mikkelsen, Los Altos, all of CA (US)

(73) Assignee: Xerox Corporation, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/427,656

(22) Filed: Oct. 26, 1999

(51) Int. Cl.⁷ .......................... G02B 26/00; G09G 3/34; B22D 11/01
(52) U.S. Cl. .................. 359/296; 345/107; 345/85; 264/4; 264/15
(58) Field of Search ............ 359/296; 345/85, 345/107; 264/4, 15

(56) References Cited

U.S. PATENT DOCUMENTS

| | | | |
|---|---|---|---|
| 4,126,854 A | 11/1978 | Sheridon | 345/107 |
| 4,143,103 A | 3/1979 | Sheridon | 264/4 |
| 4,261,653 A | 4/1981 | Goodrich | 359/296 |
| 4,438,160 A | 3/1984 | Ishikawa et al. | 427/214 |
| 4,442,019 A | 4/1984 | Marks | 252/309 |
| 4,632,517 A | 12/1986 | Asher | 359/296 |
| 4,810,431 A | 3/1989 | Leidner | 264/15 |
| 5,262,098 A | 11/1993 | Crowley et al. | 264/8 |
| 5,389,945 A | 2/1995 | Sheridon | 345/85 |
| 5,460,905 A | 10/1995 | Skotheim | 429/213 |
| 5,462,566 A | 10/1995 | Skotheim | 29/623.1 |
| 5,538,812 A | 7/1996 | Lee et al. | 429/192 |
| 5,601,947 A | 2/1997 | Skotheim et al. | 429/213 |
| 5,648,187 A | 7/1997 | Skotheim | 429/213 |
| 5,690,702 A | 11/1997 | Skotheim et al. | 29/623.1 |
| 5,716,421 A | 2/1998 | Pendalwar et al. | 29/623.2 |
| 5,772,934 A | 6/1998 | MacFadden | 264/42 |
| 5,773,166 A | 6/1998 | Matsui et al. | 429/212 |
| 5,900,858 A | 5/1999 | Richley | 345/107 |

FOREIGN PATENT DOCUMENTS

| | | | |
|---|---|---|---|
| EP | 0 821 368 A2 | | 1/1998 |
| JP | 63-94501 A | * | 4/1988 |
| JP | 63-221188 A | * | 9/1988 |
| JP | 3-139552 A | * | 6/1991 |
| JP | 3-196407 A | * | 8/1991 |
| JP | 3-238704 A | * | 10/1991 |
| JP | 7-37419 A | * | 2/1995 |
| JP | 8-27344 A | * | 1/1996 |
| JP | 8-165395 A | * | 6/1996 |
| WO | WO 96/39725 | | 12/1996 |
| WO | WO 97/44840 | | 11/1997 |
| WO | WO 97/48145 | | 12/1997 |

OTHER PUBLICATIONS

"Polymer Electrolytes" by Michel B. Armand, Ann. Rev. Mater. Sci. 1986, pp. 245–261.

* cited by examiner

Primary Examiner—Georgia Epps
Assistant Examiner—Evelyn A. Lester
(74) Attorney, Agent, or Firm—Annette L. Bade

(57) ABSTRACT

A display media with an encapsulant medium, and bichromal beads having a crystalline material, wherein the bichromal beads are dispersed or contained in the encapsulant medium is set forth.

24 Claims, 1 Drawing Sheet

BICHROMAL BEADS HAVING CRYSTALLINE MATERIALS THEREIN

CROSS REFERENCE TO RELATED APPLICATIONS

Figure 1:
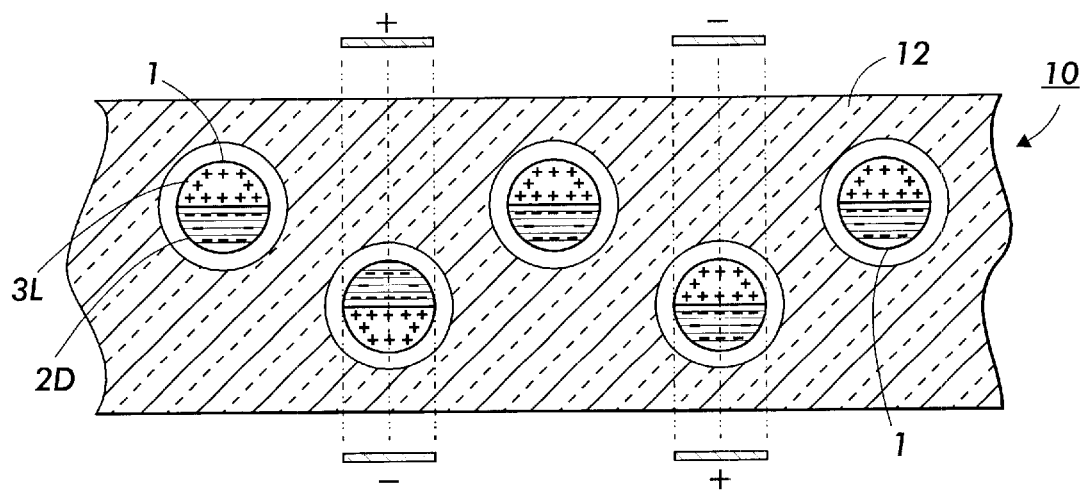

The following applications, U.S. application Ser. No. 09/427,346 filed Oct. 26, 1999 (allowed), entitled "Bichromal Beads Having Electrolytes Therein;" and U.S. application Ser. No. 09/427,411 filed Oct. 26, 1999 entitled "Bichromal Beads Having Charge Adjuvants Therein," are assigned to the same assignee of the present application. The entire disclosures of these copending applications are totally incorporated herein by reference in their entirety.

BACKGROUND OF THE INVENTION

This invention generally relates to display media, and the preparation of display media, and to devices using such display media. In particular, this invention relates to display media and displays for which the image remains in view after the field and/or power used to form the image is eliminated (completely reduced to zero), or reduced (decreased to a level below normally required to form the image). The image is formed by switching materials in the pixels between two states (such as, for example, black and white). In embodiments, the display media comprise bichromal beads. In embodiments, the bichromal beads comprise crystalline materials contained therein. The display media made with bichromal beads, for example Gyricon beads, are useful in generating images which can be stored or erased, and function by rotating a bichromal sphere by an external field to create the image.

Display media, such as Electric Paper or twisted ball panel display devices, are known and are described, for example, in U.S. Pat. Nos. 4,126,854; 4,143,103; 4,261,653; 4,438,160; 5,389,945. The media generally are comprised of an encapsulant material, for example, an elastomer, such as a cured polysiloxane, sandwiched between two indium tin oxide coated substrates, such as glass or MYLAR™. Generally, the elastomer layer has closely packed cavities, each containing a bichromal sphere suspended in a dielectric liquid. The dielectric liquid may also be present in substantial amounts in the elastomer matrix. In media that are active in an electric field, the bichromal spheres have a net dipole due to different levels of charge on the two sides of the sphere. An image is formed by the application of an electric field to each pixel of the display, which rotates the bichromal spheres to expose one color or the other to the viewing surface of the media. The spheres may also have a net charge, in which case they will translate in the electric field as well as rotate. When the electric field is reduced or eliminated, the spheres ideally do not rotate further; hence, both colors of the image remain intact. This image bistability is one feature of display media made with bichromal Gyricon beads.

The fabrication of certain bichromal spheres is known, for example, as set forth in the above mentioned U.S. Pat. No. 4,143,103 patent, wherein the sphere is comprised of black polyethylene with a light reflective material, for example, indium, sputtered on one hemisphere. Also in U.S. Pat. No. 4,438,160, a rotary ball is prepared by coating white glass balls of about 50 microns in diameter, with an inorganic coloring layer such as co-deposited $MgF_2$ and chromium by evaporation. In a similar process, there is disclosed in an article entitled "The Gyricon—A twisting Ball Display", published in the proceedings of the S.I.D., Vol. 18/3 and 4 (1977), a method for fabricating bichromal balls by first heavily loading chromatic glass balls with a white pigment such as titanium oxide, followed by coating from one direction in a vacuum evaporation chamber with a dense layer of nonconductive black material which coats only one hemisphere.

Also in U.S. Pat. No. 4,810,431 by Leidner, there is disclosed a process for generating spherical particles by (a) coextruding a fiber of a semi-circular layer of a polyethylene pigmented white and a black layer of polyethylene containing magnetite, (b) chopping the resultant fiber into fine particles ranging from 10 microns to about 10 millimeters, (c) mixing the particles with clay or anti-agglomeration materials, and (d) heating the mixture with a liquid at about 120° C. to spherodize the particles, followed by cooling to allow for solidification.

In another method, the bichromal beads used in the fabrication of display media such as Gyricon electric paper are formed by wetting the top and bottom surfaces of a spinning disk with two different pigmented molten solids. These streams combine at the edge of the disk and, driven by a Taylor instability, they form a series of jets emanating from the edge of the disk. In particular, a 3 inch diameter disk will have about 300 such jets. Each jet is seen with high speed video to be comprised of two very distinct parts corresponding to the two pigmented liquids used, with no apparent mixing within the jet. The jets subsequently break up into spheres by the Rayleigh instability. Again, with high speed video, is can be seen that close to the jet break-up points, these spheres are very high quality, hemispherical bichromal spheres.

When the beads are later collected, having hardened in air before reaching the base plate, they are found to have a degree and a percentage of imperfections that were not seen when they were first formed. Some of these imperfections were obviously caused by collisions of still-molten beads. Specifically, larger beads move longer distances before slowing as compared to smaller beads, thereby causing distributions of velocities that lead to collisions. In addition to collisions, other imperfections such as engulfing may result. Engulfing is when one liquid will flow partly or completely over the other liquid. This is caused partly by surface tension differences and partly by viscosity differences. Such engulfing is not the result of collisions, but rather, is the result of interactive flow of the two liquids after initial bead formation. Both of these conditions, collisions and engulfing, are greatly minimized by causing the beads to solidify quickly after initial formation.

Therefore, it is desired to provide a process for making bichromal beads which does not result in the imperfections discussed above.

The present invention provides, in embodiments, for bichromal sphere formulations that include crystalline materials in order to help reduce the imperfections caused during the process of making bichromal beads.

SUMMARY OF THE INVENTION

Embodiments of the present invention include: a display media comprising a) an encapsulant medium, and b) bichromal beads comprising a crystalline material, wherein the bichromal beads are dispersed in the encapsulant medium.

Embodiments also include: a display media comprising a) an encapsulant medium, and b) bichromal beads comprising a crystalline polyethylene wax having a molecular weight of from about 400 to about 4,000, and wherein the bichromal beads are dispersed in the encapsulant medium.

Embodiments further include: a display apparatus capable of causing an image to be displayed on a display media comprising: a) an encapsulant medium, and b) bichromal beads comprising a crystalline material, wherein said bichromal beads are dispersed in said encapsulant medium; and a means for orienting said bichromal beads in said substrate so as to form an image on said display media.

DETAILED DESCRIPTION OF THE INVENTION

The present invention relates to twisting ball display media containing bichromal beads or balls. The display media comprises a media that, in embodiments, has many attributes of a paper document. For example, in embodiments, the media may look like paper, have ambient light behavior like paper, be flexible like paper, be carried around like paper, be copied like paper, and have nearly the archival memory of paper.

Referring to FIG. 1, there is shown a cross sectional view of a portion of a display media 10 comprising a plurality of bichromal beads 1 which have a darker pigmented hemisphere 2D on one side and a lighter hemisphere 3L on the other side.

Figure 2:
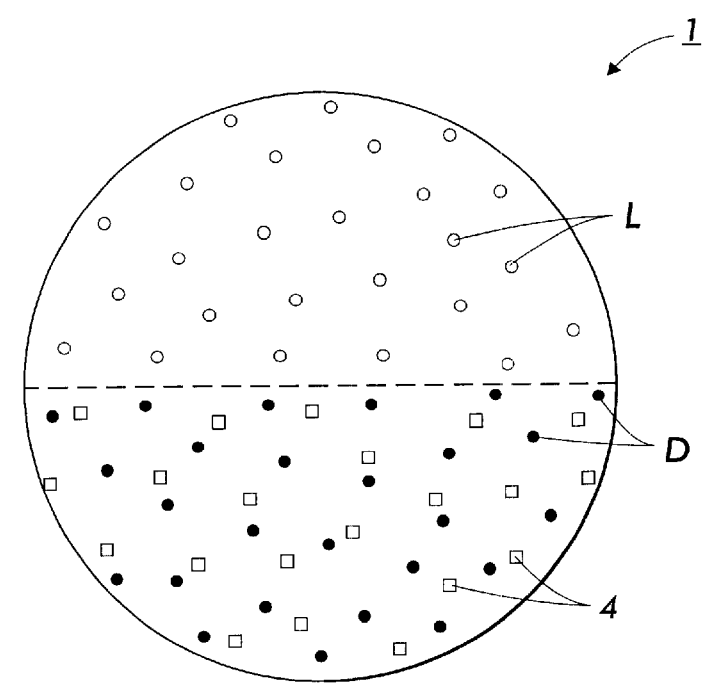

FIG. 2 is an enlarged view of the bichromal beads 1, and depicts lighter pigments L dispersed or contained in hemisphere 3L, and depicts darker pigments D in hemisphere 2D. The display media 12 can be any media capable of displaying an image, such as a sheet, and may comprise any suitable material for housing the bichromal beads such as, for example, an elastomer material.

As shown in FIG. 1, each of the hemispheres 3L and 2D contain electrical charges. Details of such phenomenon can be found in U.S. Pat. No. 5,900,858, the disclosure of which is hereby incorporated by reference in its entirety.

The display media described herein can be used in a display apparatus or device for the purpose of causing an image to be formed on the display media. In general, bichromal spheres are dispersed or contained in an encapsulant medium. In optional embodiments, the beads may be microencapsulated. In this case, the beads may still be dispersed or contained in an encapsulant medium, but they may also be, e.g., painted or brushed onto surfaces, or the like. The bichromal spheres of the present invention which comprise hemispheres of different colors and different amounts of electrostatic or electrodynamic charge are useful as a flexible "electric paper" display media. The present invention is generally directed to a display media, or a rotary twisted ball, electric paper or a Gyricon display media, comprised of bichromal spheres or Gyricon beads. The flexible display media, under the action of an external electric field, allows the bichromal spheres to rotate in accordance with their electrical anisotropy within the substrate to provide an image.

In preferred embodiments, the bichromal spheres are darker or black on one side and lighter or white on the other side. Preferred bichromal spheres consist of white pigment titanium dioxide dispersed in a wax on one side of the bead, and a black pigment dispersed in a wax on the other side of the bead.

The bichromal spheres are relatively small, for example from about 2 to about 200 microns in diameter, and preferably from about 30 to about 120 microns in diameter.

The bichromal spheres are preferably fabricated by the processes as disclosed in U.S. Pat. No. 5,262,098, or as disclosed in copending application Ser. No. 09/360,088, mailed Jul. 23, 1999, entitled "Method and Apparatus for Fabricating Bichromal Elements," and Ser. No. 09/360,052 mailed Jul. 23, 1999, entitled "Method and Apparatus for Fabricating Bichromal Elements." Alternatively, other known methods for the preparation of bichromal spheres can be practiced, such as disclosed in U.S. Pat. No. 4,126,854. The disclosure of each of these references is hereby incorporated by reference in their entirety.

In general, bichromal beads used in the fabrication of display media such as Gyricon electric paper are formed by wetting the top and bottom surfaces of a spinning disk with two different pigmented molten solids. These streams combine at the edge of the disk and form a series of jets emanating from the edge of the disk. Each jet is seen with high speed video to be comprised of two very distinct parts corresponding to the two pigmented liquids used, with no apparent mixing within the jet. The jets subsequently break up into spheres by the Rayleigh instability. Again, with high speed video, is can be seen that close to the jet break-up points, these spheres are very high quality, hemispherically bichromal spheres.

When the beads are later collected, having hardened in air before reaching the base plate, they are found to have a degree and a percentage of imperfections that were not seen when they were first formed. Some of these imperfections are caused by collisions of still-molten beads. Specifically, larger beads move longer distances before slowing as compared to smaller beads, thereby causing distributions of velocities that lead to collisions. Other imperfections, in addition to collisions, such as engulfing can be caused. Engulfing is where one liquid will flow partly or completely over the other liquid. This is caused partly by surface tension differences and partly by viscosity differences. Such engulfing is not the result of collisions, but rather, is the result of interactive flow of the two liquids after initial bead formation. Both of these conditions, i.e., collisions and engulfing, are greatly minimized by causing the beads to solidify quickly after initial formation.

Crystalline materials have been demonstrated by the inventors to be ideal for the production of high quality bichromal (and other configurations) beads. This is due to the crystalline material's ability to transition rapidly from a low viscosity liquid to a solid as they cool by moving through the air. If the beads are produced close to the phase transition temperature of these materials, the beads produced from the crystalline materials will travel only short distances before they solidify. Therefore, the beads, in embodiments, will demonstrate little or no decrease in quality.

Organic polymers and resins, such as polyethylene, will normally have little or no crystalline properties. This is due to the relatively large size range of the molecules in the resin or polymer. Polyethylene and other resins and polymers can be processed in such a way that they have a narrow range of molecular chain lengths. When this is done, the resins or polymers have strong crystalline properties.

Examples of suitable crystalline materials include any resin, polymer, wax, or other material, that demonstrates crystalline properties. By "crystalline," the inventors are referring to materials that remain solid as the temperature is increased. Specifically, when the melting point of the material is reached, a crystalline material will melt, sometimes abruptly, and become a low viscosity liquid. This is a desired feature of the crystalline material. This property preserves the hemispherical bichromal quality of the beads after they are formed by the break-up of the Taylor instability jets formed on the edge of the spinning disk during manufacture.

It is preferred that the crystalline materials have a linear structure. It is also preferred that the crystalline materials have a low polydispersity or narrow molecular weight distribution, which aids in the material having a high crystalline property. Also preferred are crystalline materials having a relatively low melting point of from about 50 to about 180° C., and more specifically from about 80 to about 130° C. Further, it is preferred that the crystalline material have a carbon content of from about 18 to about 1,000, and more specifically from about 50 to about 200 carbon atoms.

Examples of suitable crystalline materials include any material in which the material remains solid as the temperature is raised, and in which when the melting point is reached, the material melts, sometimes abruptly, and becomes a low viscosity liquid. Specific examples include crystalline polyethylenes, crystalline olefins, other crystalline and transparent plastics, Candellia wax, Carnauba wax, and like crystalline materials. Specifically preferred are crystalline materials having a molecular weight of from about 400 to about 4,000, and particularly preferred, of from about 600 to about 2,000. In a preferred embodiment, the crystalline material is a crystalline polyethylene material, and particularly preferred, a crystalline polyethylene material having molecular weight of from about 400 to about 4,000, and particularly preferred, of from about 600 to about 2,000. A commercial example of a crystalline polyethylene includes Polywax® 1000 from Baker Petrolite Corporation. This crystalline polyethylene has a molecular weight of about 1000. The melting point is about 113° C. This crystalline polyethylene also has a density of 0.97 g/cc at 25° C., low viscosity of about 12 cP at 149° C., penetration of 1.0 at 25° C., and penetration of 4.5 at 60° C.

Turning to FIG. 2, a preferred embodiment is demonstrated, wherein crystalline materials 4 are dispersed or contained in the hemisphere 2D containing the darker pigment D.

In embodiments, a pigment is used. Preferably, the darker pigment in the darker hemisphere 2D is a manganese ferrite or carbon black, although other suitable pigments can be used such as modified carbon blacks, magnetites, ferrites, and color pigments. In an embodiment wherein a black pigment is used, a preferred black pigment is 6331 from Ferro Corporation. In an embodiment wherein a lighter or white pigment is used in the lighter hemisphere 3L, a preferred white pigment is DuPont R104 TiO$_2$ pigment.

The bichromal beads are dispersed or contained in an encapsulant medium. Preferably, the encapsulant medium comprises an elastomer material. Specific examples of preferred elastomer materials include polysiloxanes, such as Sylgard® 184. Examples of suitable elastomer materials are included in U.S. Pat. No. 4,126,854, the disclosure of which is incorporated herein in its entirety.

Preferably, the encapsulant medium comprises a liquid material for the purpose of providing liquid-filled cavities for each bichromal bead in which the bead can rotate relatively freely. Without any fluid around the bead, the bead is tightly held in the elastomer and cannot rotate, since there is no gap between the bead and the elastomer. Preferred liquid materials include oils such as Iopare® oils or silicone oils, for example, Dow Corning 200 silicone oil, 10 cs or less. Preferably, the substrate is swelled in the oil. Reference is made to U.S. Pat. No. 4,126,854 which discusses oils and how an elastomer is swelled in oil.

In embodiments, the encapsulant medium comprising the bichromal beads dispersed or contained therein, is sandwiched between two outer substrates which, in total, comprise the display media. The outer surfaces are addressed by some means to produce the desired electric field at each pixel of the display. Preferably, the outer substrates comprise indium tin oxide coatings such as glass or MYLAR®.

All the patents and applications referred to herein are hereby specifically and totally incorporated herein by reference in their entirety in the instant specification.

The following Examples further define and describe embodiments of the present invention. Unless otherwise indicated, all parts and percentages are by weight.

EXAMPLES

Example 1

Preparation of Bichromal Beads Using Crystalline Material

A black pigmented wax was made by dispersing 20% of F-6331 pigment (Ferro Corp.), 2.3% of X-5175 (Baker-Petrolite UNITHOX®, acetate ester, $E_{16.7}EO_{42}$), and 77.7% of Polywax® 1000 (Baker-Petrolite). This wax and a white wax consisting of 20% TiO$_2$ (R104 from DuPont) and 80% Polywax® 1000 were used to make bichromal balls. The balls were sieved into fractions, and the 90–106 micron fraction was used to make an elastomer sheet. The sheet was made by mixing 5.00 g of SYLGARD® 184 base, 0.75 g SYLGARD® 184 curing agent, and 5.75 g of the 90–106 micron balls; placing the mixture under vacuum to de-aerate; casting the mixture into a 0.012 inch sheet; and curing at 90° C. for 2 hours. After curing, small subsheets were cut out and soaked in ISOPAR®-L with anhydrous calcium sulfate overnight.

The subsheets were made into displays by mounting between two glass plates coated with indium tin oxide in order to test the soaked subsheets. The surface of the glass plates with the indium tin oxide coating was placed on the inside adjacent to the subsheet. In the final test display, the components from one side to the other are glass, ITO coating, soaked subsheet, ITO coating on glass plate #2, glass plate #2.

The above steps were repeated using the following formulations set forth in Table I below. The above experiment used Formulation 1 below.

TABLE 1

| Formulation | White Side | Black side |
| --- | --- | --- |
| Formulation 1 | 80% Polywax ® 1000<br>20% DuPont R104<br>(TiO$_2$) | 77.7% Polywax ® 1000<br>20% Ferro 6331 pigment<br>2.3% 5175 |
| Formulation 2 | 80% Polywax ® 1000<br>20% DuPont R104<br>(TiO$_2$) | 77.7% Polywax ® 1000<br>20% Cabot 520 carbon<br>black<br>2.3% 5175 |
| Formulation 3 | 80% Polywax ® 1000<br>20% DuPont R104<br>(TiO$_2$) | 82.7% Polywax ® 1000<br>5% Sun Blue/green flush<br>pigment<br>2.3% 5175 |

When these formulations were processed to produce bichromal beads using the above cited spinning disk technique, approximately 100% of the product was recovered in the form of beads.

Example 2

Preparation of Bichromal Beads Using Known Branched Polyethylene Material

The above experiment was repeated, except that the crystalline polyethylene (Polywax® 1000 from Baker-Petrolite) was replaced with a known branched polyethylene material in the same amounts.

Attempts to make the bichromal beads from a typical branched polyethylene having a broad range of molecular weights and therefore little or no crystalline behavior, resulted in a very low yield (less than 1%) of bichromal beads and a large quantity of fibers, reminiscent of cotton candy.

Other modifications of the present invention may occur to one of ordinary skill in the art subsequent to a review of the present application, and these modifications, including equivalents, or substantial equivalents thereof, are intended to be included within the scope of the present invention.

We claim:

1. A display media comprising a) an encapsulant medium, and b) bichromal beads comprising a crystalline material, wherein said bichromal beads are dispersed in said encapsulant medium.

2. A display media in accordance with claim 1, wherein said crystalline material has a narrow molecular weight distribution.

3. A display media in accordance with claim 1, wherein said crystalline material has a molecular weight of from about 400 to about 4,000.

4. A display media in accordance with claim 3, wherein said molecular weight is from about 600 to about 2,000.

5. A display media in accordance with claim 1, wherein said crystalline material is linear.

6. A display media in accordance with claim 1, wherein said crystalline material has a carbon content of from about 18 to about 1,000 carbon atoms.

7. A display media in accordance with claim 6, wherein said carbon content is from about 50 to about 200 carbon atoms.

8. A display media in accordance with claim 1, wherein said crystalline material has a melting point of from about 50 to about 180° C.

9. A display media in accordance with claim 8, wherein said crystalline material has a melting point of from about 80 to about 130° C.

10. A display media in accordance with claim 1, wherein said crystalline material is a crystalline wax.

11. A display media in accordance with claim 1, wherein said crystalline wax is a crystalline polyethylene wax.

12. A display media in accordance with claim 11, wherein said crystalline polyethylene wax has a narrow molecular weight distribution.

13. A display in accordance with claim 12, wherein said crystalline polyethylene wax has a molecular weight of from about 400 to about 4,000.

14. A display media in accordance with claim 12, wherein said crystalline polyethylene wax has a molecular weight of from about 600 to about 2,000.

15. A display in accordance with claim 11, wherein said crystalline polyethylene wax has a melting point of from about 50 to about 180° C.

16. A display media in accordance with claim 1, wherein said bichromal beads further comprise a pigment.

17. A display media in accordance with claim 16, wherein said pigment is selected from the group consisting of carbon black and titanium oxide.

18. A display media in accordance with claim 1, wherein said encapsulant medium comprises an elastomer.

19. A display media in accordance with claim 18, wherein said elastomer comprises a polysiloxane.

20. A display media in accordance with claim 18, wherein said elastomer comprises an oil.

21. A display media in accordance with claim 1, wherein said bichromal beads are microencapsulated.

22. A display media comprising: a) an encapsulant medium, and b) bichromal beads comprising a crystalline polyethylene wax having a molecular weight of from about 400 to about 4,000, and wherein the bichromal beads are dispersed in said encapsulant medium.

23. A display apparatus capable of causing an image to be displayed on a display media comprising:
   i) a) an encapsulant medium, and b) bichromal beads comprising a crystalline material, wherein said bichromal beads are dispersed in said encapsulant medium; and
   ii) a means for orienting said bichromal beads in said encapsulant medium to form an image on said display media.

24. A display apparatus in accordance with claim 23, wherein said crystalline material is a crystalline polyethylene wax.

* * * * *